(12) United States Patent
Pawlowski et al.

(10) Patent No.: US 12,388,712 B2
(45) Date of Patent: Aug. 12, 2025

(54) IN-NETWORK MULTICAST OPERATIONS

(71) Applicant: Intel Corporation, Santa Clara, CA (US)

(72) Inventors: Robert Pawlowski, Beaverton, OR (US); Vincent Cave, Hillsboro, OR (US); Shruti Sharma, Hillsboro, OR (US); Fabrizio Petrini, Menlo Park, CA (US); Joshua B. Fryman, Corvallis, OR (US); Ankit More, San Mateo, CA (US)

(73) Assignee: Intel Corporation, Santa Clara, CA (US)

(*) Notice: Subject to any disclaimer, the term of this patent is extended or adjusted under 35 U.S.C. 154(b) by 335 days.

(21) Appl. No.: 17/473,540

(22) Filed: Sep. 13, 2021

(65) Prior Publication Data

US 2021/0409265 A1    Dec. 30, 2021

Related U.S. Application Data

(60) Provisional application No. 63/142,664, filed on Jan. 28, 2021.

(51) Int. Cl.
| | |
|---|---|
| *H04L 41/0893* | (2022.01) |
| *H04L 41/0803* | (2022.01) |
| *H04L 41/0895* | (2022.01) |
| *H04L 41/40*   | (2022.01) |
| *H04L 43/20*   | (2022.01) |

(52) U.S. Cl.
CPC ...... *H04L 41/0893* (2013.01); *H04L 41/0803* (2013.01); *H04L 41/0895* (2022.05); *H04L 41/40* (2022.05); *H04L 43/20* (2022.05)

(58) Field of Classification Search
CPC .................................................. H04L 41/0803
USPC ......................................................... 709/220
See application file for complete search history.

(56) References Cited

U.S. PATENT DOCUMENTS

| | | | |
|---|---|---|---|
| 1,712,955 A | 5/1929 | Gustafson | |
| 10,476,492 B2 | 11/2019 | More et al. | |
| 2004/0170176 A1* | 9/2004 | Kadambi | H04L 45/24 370/395.31 |

(Continued)

FOREIGN PATENT DOCUMENTS

| | | | | |
|---|---|---|---|---|
| CN | 1534944 A | * | 10/2004 | ............. H04L 45/00 |
| EP | 2899644 A1 | * | 7/2015 | ........... G06F 15/167 |
| WO | WO-2018059497 A1 | * | 4/2018 | |

OTHER PUBLICATIONS

Machine Translation of EP 2899644 (Year: 2015).*

(Continued)

*Primary Examiner* — Ruolei Zong
(74) *Attorney, Agent, or Firm* — Compass IP Law PC (57) ABSTRACT

Examples described herein relate to a first group of core nodes to couple with a group of switch nodes and a second group of core nodes to couple with the group of switch nodes, wherein: a core node of the first or second group of core nodes includes circuitry to execute one or more message passing instructions that indicate a configuration of a network to transmit data toward two or more endpoint core nodes and a switch node of the group of switch nodes includes circuitry to execute one or more message passing instructions that indicate the configuration to transmit data toward the two or more endpoint core nodes.

26 Claims, 7 Drawing Sheets

(56) References Cited

U.S. PATENT DOCUMENTS

| | | | |
|---|---|---|---|
| 2004/0196795 A1* | 10/2004 | Yang | H04L 45/16 |
| | | | 370/254 |
| 2009/0245134 A1* | 10/2009 | Archer | G06F 9/542 |
| | | | 370/254 |
| 2011/0072239 A1* | 3/2011 | Burger | G06F 9/3885 |
| | | | 712/E9.002 |
| 2013/0138930 A1* | 5/2013 | Wilson | G06F 9/546 |
| | | | 712/E9.034 |
| 2013/0191434 A1* | 7/2013 | Smith | H04L 69/161 |
| | | | 709/201 |
| 2016/0013021 A1 | 1/2016 | Gold | |
| 2016/0154717 A1 | 6/2016 | Rivera et al. | |
| 2017/0220499 A1* | 8/2017 | Gray | G06F 13/36 |
| 2017/0230298 A1 | 8/2017 | Perry | |
| 2019/0042513 A1* | 2/2019 | Fleming, Jr. | G06F 9/30145 |
| 2019/0205269 A1* | 7/2019 | Fleming, Jr. | G06F 13/1673 |
| 2020/0004602 A1 | 1/2020 | Pawlowski et al. | |

OTHER PUBLICATIONS

International Search Report and Written Opinion for PCT Patent Application No. PCT/US21/51300, Mailed Dec. 28, 2021, 10 pages.
Aananthakrishnan, Sriram et al., "PIUMA: Programmable Integrated Unified Memory Architecture", arXiv:2010.06277v1, Oct. 13, 2020, 6 pages.

* cited by examiner

IN-NETWORK MULTICAST OPERATIONS

RELATED APPLICATION

The present application claims the benefit of priority of U.S. Provisional application 63/142,664, filed Jan. 28, 2021. The contents of that application are incorporated in their entirety herein.

STATEMENT OF GOVERNMENT RIGHTS

This invention was made with Government support under Agreement No. HR0011-17-3-004, awarded by Defense Advanced Research Projects Agency (DARPA). The Government has certain rights in the invention.

DESCRIPTION

As multi-processor systems increase in scale, efficient communication between processors becomes a factor in overall application performance. Additionally, the ability for a single core in a system to efficiently send messages to others via a broadcast (one-to-all) or multicast (one-to-n) implementation is a feature in scaled systems. Broadcast and multicast communications are communication patterns that apply to different programming abstractions and models, which makes them applicable to a wide range of use-cases. For example, fork-join, data-flow, and bulk synchronous models can utilize broadcast and multicast implementations.

In fork-join models, broadcast and multicast operations can be used by a parent activity to control as well as communicate data to child activities. In data-flow models, broadcast and multicast operations can be used to activate and send data to dependent activities such as assigning weights and biases in neural networks. In the Single Program Multiple Data (SPMD) paradigm, broadcast and multicast allow for an activity to send control signals or data to a set or subset of other activities. For example, in domain decomposition codes, a domain can communicate data to its neighbor domains. Additionally, the broadcast and multicast operations can be relied upon by activities throughout a system to achieve non-functional operations such as scheduling, resilience, monitoring, performance telemetry, and others.

An implementation of broadcast or multicast in a multi-core architecture is via direct point-to-point messages sent from a source core to receiver cores. The source core iterates through the group, sending messages to each core in the multicast or broadcast group individually. This implementation can be handled at the software level, but may be inefficient due to the thread resources used to facilitate this process in the foreground. As the system size scales, broadcasts using this implementation can become even more burdensome on the source core.

Broadcast and multicast messaging have been supported in many different instances in network architecture. These implementations may support broadcast or multicast by using addresses targeted to specific device groups, and the distribution of messages to members of the group handled by the network interface controller (NIC). However, these architectures may lack the granularity of configurability for distributed memory architectures with multiple network hops between cores in a single die as well as between dies in a system. For scalable systems with various levels of hierarchy (e.g., core, die, pod, rack, etc.), configurability may be needed at locations within the system including both on-die network and inter-node switches.

DETAILED DESCRIPTION

Some examples provide an approach to providing multicast and broadcast operations in a scalable system using a network of configurable switches. Some examples utilize particular instruction set architecture (ISA) extensions as well as hardware to support interrupt generation and handling of data receipt and processing for multicast or broadcast operations. Using configurable switches in a scalable architecture allows for potential to improve performance of a multicast to cores in a system.

Some examples provide instructions that allow programmers and workload owners to cause a core to place a packet or data into a network and propagate the packet or data to N number of other nodes or cores, where N is 2 or more. Receiving nodes or cores can receive the packet or data and interrupt a thread on a core to fetch packet or data from a queue and the packet or data into another location. Reference to a core herein can refer to a core, processor, accelerator, or other device.

Some examples can utilize configurability of collective virtual circuits (VCs) in the network switches. In some examples, this configurability is implemented as per-port register descriptions that specify direction data is to be received or transmitted for one or more ports. Switches can be configured using bit vectors to indicate a direction a port is to receive or transmit data within a tile or between tiles.

Some examples can be used with the Intel® Programmable and Integrated Unified Memory Architecture (PIUMA), although examples can apply to other architectures such as NVIDIA Graphcore, Cray Graph Engine, and others. PIUMA can include a parallel, scalable system targeting sparse graph applications. A single PIUMA core can include one or more multi-threaded pipelines and single-threaded pipelines. Some examples described herein can be used for added in-network collectives for in-network All-Reduce with reductions and barriers.

Figure 1:
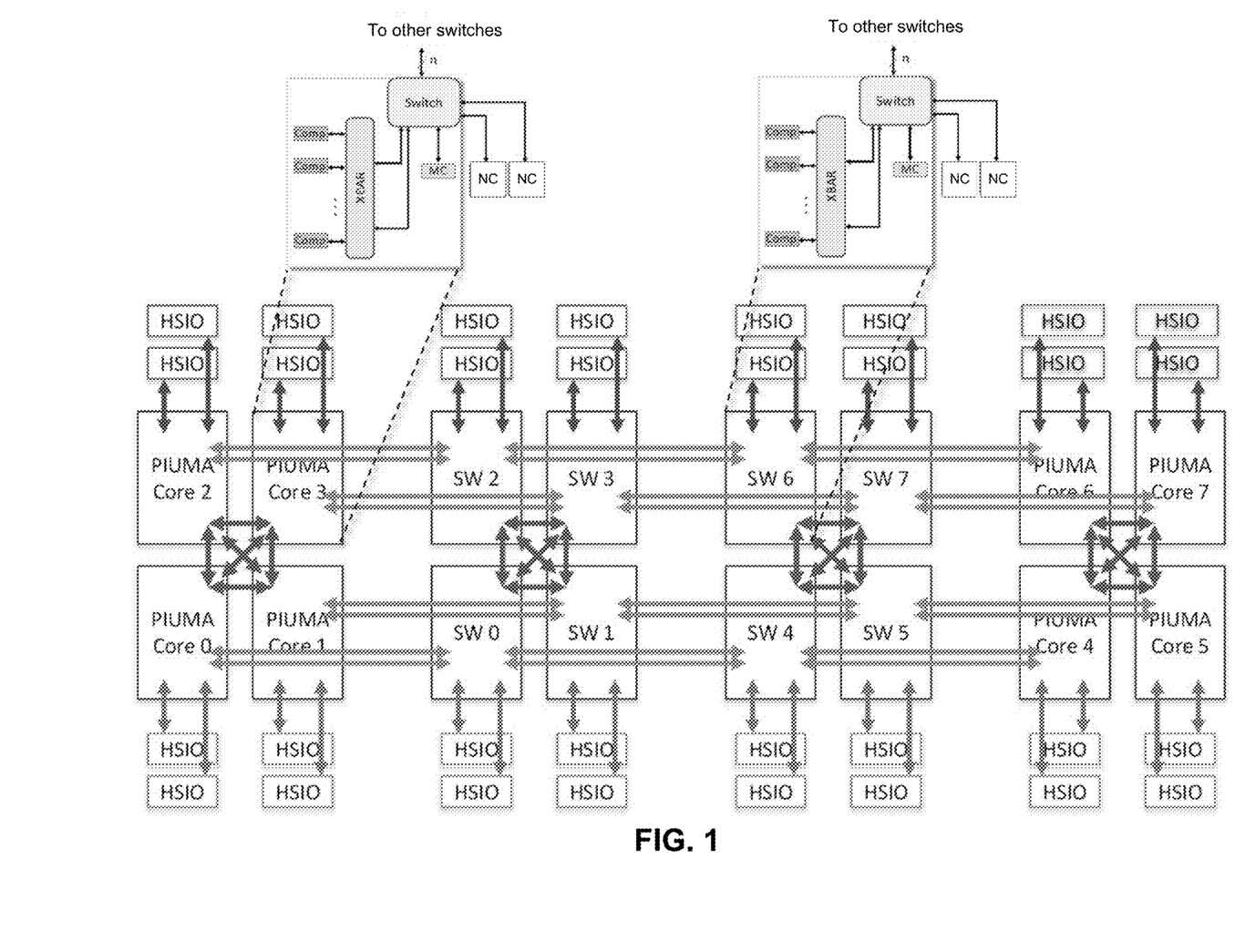
FIG. 1 depicts an example Programmable and Integrated Unified Memory Architecture (PIUMA) die.

FIG. 1 depicts a PIUMA die that can include eight PIUMA cores (PIUMA cores 0 to 7). A PIUMA core can include a crossbar (XBAR) that communicatively couples compute elements (Comp) to a switch. A PIUMA core switch can interface with a memory controller (MC), another PIUMA core switch, a switch, and/or network components (NC). A PIUMA die can include eight network switches (SW0 to SW7) (referred to as peripheral switches) and 32 high-speed I/O (HSIO) ports for inter-die connectivity. Beyond a single die, system configurations can scale to multitudes of nodes with a hierarchy defined as 16 die per subnode and two subnodes per node. PIUMA network switches can include support for configurable collective communication. In some examples, a die can include one or more core tiles and one or more switch tiles. In some examples, 4 cores can be arranged in a tile; 4 switches can be arranged in a tile; 4 tiles can be arranged in a die; and 32 die can part of a node. However, other numbers of cores and switches can be part of a tile, other numbers of tiles can be part of a die, and other numbers of die can be part of a node.

Figure 2:
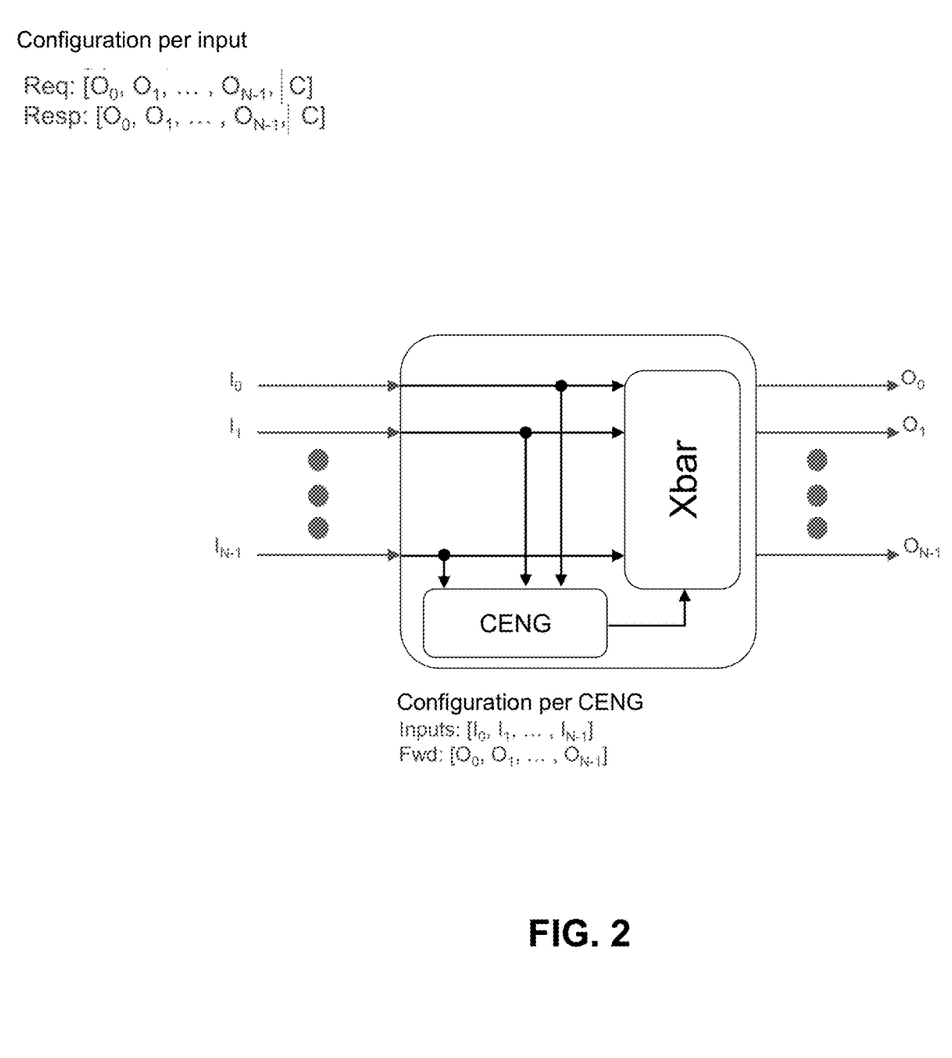
FIG. 2 shows a logical block diagram of a switch.

FIG. 2 shows a logical block diagram of a switch with N ports. A collective engine (CENG) can be used to support in-switch compute capability for reductions and prefix scans. For in-network reductions and prefix scans, at least one input port of the switch ($I_0$ to $I_{N-1}$) can include two sets of configuration registers, namely, a request (Req) configuration register for the forward path of a reduction or prefix-scan operation and a Response (Resp) configuration register for the reverse path or a reduction or prefix-scan. The request configuration register can be used for some multicast examples described herein.

A per-port request configuration register, described herein, can store a bit vector which represents which output ports ($O_0$ to $O_{N-1}$) data from an input port is forwarded-to. Additionally, an indicator (e.g., bit) can be included to indicate if the input port is sending its value to the switch's collective engine for reductions and prefix-scans. For multicasts and broadcasts, this bit can be set to 0. For an operation type, a bit vector could be set to all 0s.

Some examples can include ISA extensions and PIUMA core architecture modifications for multicasting a message throughout a system using a single instruction. Some examples can include architecture modifications to allow for interrupt generation and storage of received multicast messages to attempt to prevent participating cores having to condition the local engine to receive expected multicast messages. Some examples can include use of the configurable in-network switch tree to allow for a single message to take the shortest path (e.g., fewest number of core or switch node traversals) when propagating data to desired cores in the system.

ISA Support Multicasts in the PIUMA System

In some examples, the PIUMA ISA includes instructions specific to the multicast capability. Examples of these instructions are shown in Table 1 and can be issued by a multi-threaded pipeline (MTP) or single-threaded pipeline (STP) in a PIUMA core.

TABLE 1 mcast.{send/poll/wait} instruction definitions.

| Instruction | ASM Form Arguments | Argument Descriptions |
|---|---|---|
| mcast.send | r1, r2, r3, SIZE | r1 = mcast tree ID; r2.SIZE = Data value to send; r3 = ID value of sending thread |
| mcast.poll | r1, r2, r3, r4 | r1 = Status of mcast.read; r2 = data value; r3 = ID value of thread that sent data; r4 = mcast tree ID |
| mcast.wait | r1, r2, r3, SIZE | r1 SIZE = data value; r2 = ID value of thread that sent data; r3 = mcast tree ID |

Instruction mcast.send can be issued by a data sending thread. When a thread executes instruction mcast.send, it sends data and identifier to be multi-casted over the PIUMA network. Because multiple connectivity configurations are supported, the instruction includes a value specifying the configured network tree identifier (ID). For example, a thread executing on a core can a send value with thread ID using configuration on a network (tree). The configuration can be set prior to the sending of the value in some examples. A developer can specify r1 to set configuration values for nodes in network to use to receive and transmit data to recipients on a path towards destinations.

Instruction mcast.poll can be issued by a thread in a receiving core. Execution of instruction mcast.poll can cause fetching of an oldest received multicast (mcast) message currently residing in its local queue (e.g., mcast queue) and return the data and thread ID associated with the data. Instruction mcast.poll can be non-blocking to the issuing thread and can return a fail status if there were no messages waiting in the mcast queue. A receiving core can execute multiple threads and a specific thread can poll a receive queue to check if a value was received in a non-blocking manner. The specific thread can return a status and value.

Instruction mcast.wait can be issued by a thread in a receiving core. Instruction mcast.wait can perform similar operations as that of instruction mcast.poll, except that it is blocking to the issuing thread, e.g., it will not allow forward progress of the issuing thread until is returns valid data from the mcast queue. If there is no data in the mcast queue when the instruction is issued, it will wait until data is available. A receiver thread can wait to receive data before proceeding with execution.

Figure 3:
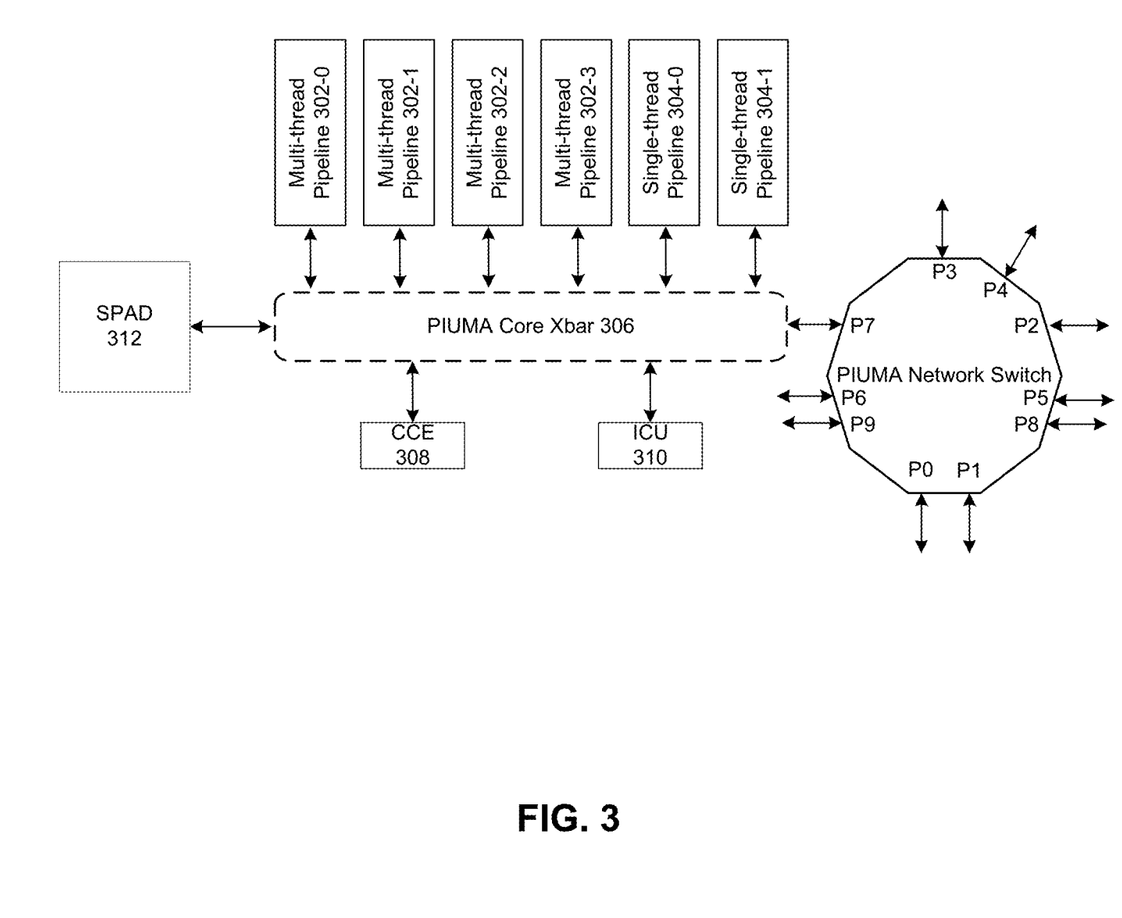
FIG. 3 shows an example of PIUMA core organization.

Various example operations of a PIUMA core to support the multicast functionality of sending and receiving messages are described next. FIG. 3 shows an example of PIUMA core organization. In this example, six pipelines (e.g., MTP 302-0 to 302-3 and STP 304-0 to 304-1) can be connected with a PIUMA core collective engine (CCE) 308 through a crossbar 306. Additionally, FIG. 3 shows the local core interrupt controller unit (ICU) 310, core-local scratch-pad (SPAD) memory 312, and one or more ports of the core's network switch (e.g., P7).

Figure 4:
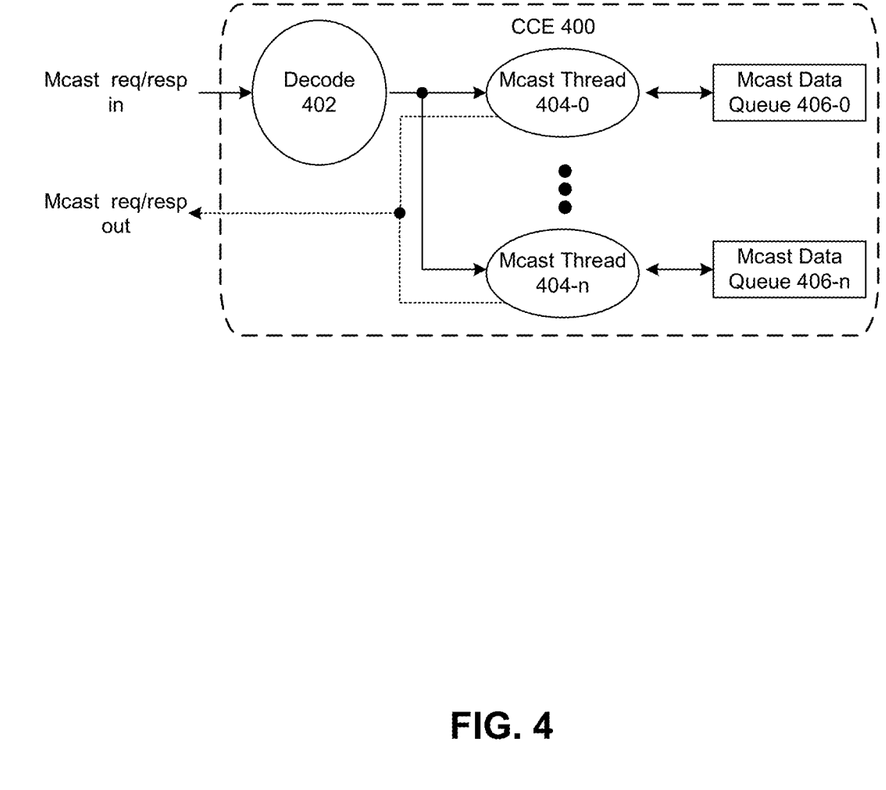
FIG. 4 shows an example of internal organization of a core collective engine.

FIG. 4 shows an example of internal organization of a PIUMA CCE. Instructions are received from the PIUMA core crossbar (xbar) port, decoded by decoder 402, and sent to the proper mcast thread (e.g., one or more of Mcast threads 404-0 to 404-n) managing the collective ID targeted by the received mcast.* instruction. A thread can include a data queue (e.g., one or more of Mcast data queues 406-0 to 406-n) with a slot holding the data and identifier received as the result of a multicast. A receiver can access a queue for a particular network or tree configuration. A thread can be interrupted when the queue is full or data is received.

Mcast.send instructions issued from a pipeline in the core can be sent to a local core CCE 400. At CCE 400, the request can be assigned to a proper mcast thread (e.g., one or more of Mcast thread 404-0 to 404-n) associated with the received collective ID. For data and identifier (included in the instruction request), the mcast thread can copy or move data and identifier into the mcast thread's data queue (e.g., Mcast data queue 406-0 to 406-n). The data and identifier can be sent out to the local PIUMA network switch to be propagated across a collective tree or network path that includes multiple core and/or switch nodes. The message can include the collective ID to reference the proper switch configuration.

At a point, CCE 400 may receive a message from the local network switch as a result of a multicast from a remote core. This message can be a unique request which includes the collective ID, data, and identifier. After receipt, CCE 400 can identify the target mcast thread ID and push the data and identifier onto its associated queue. After data occupies the CCE's mcast queue, the queue status can be exposed to the local PIUMA core's threads using one or more of the following technologies: PUSH or POLL.

For a PUSH (interrupt), CCE 400 can trigger an interrupt via a local core's ICU that can launch on at least one of the local core's STPs. This interrupt routine can inspect the status of the mcast data queues (e.g., via the MSRs described in Table 2), access data on the queue, and store the data in the PIUMA core's local memory or cache for the local threads to access.

For a POLL operation, one or more of the local PIUMA core's threads can consistently poll the CCE mcast threads for messages that have been received from remote mcast operations, such as by looping on the mcast.poll instruction and placing data received from successful poll requests into a local memory or cache. A mcast.poll that is successful can remove the returned message from the mcast ID's data queue.

One, a strict subset, or all of mcast queues 406-0 to 406-$n$ can include a set of machine specific registers (MSRs) that are visible and accessible in the PIUMA address map and accessible by software. An example of MSRs are listed in Table 2 can provide control of interrupt-generating events in the queue and to give queue status visibility to the interrupt handler.

TABLE 2

Core collective engine MSR entries that exist for each muticast ID

| Name | Description | Software read (R)/write (W)? |
|---|---|---|
| MODE | Push-mode or poll-mode. | R/W |
| COUNT | Current number of messages occupying the queue. | R |
| INT_ALL | Send an interrupt every time a message is added to the queue. | R/W |
| INT_EMPTY_2_NEMPTY | If not interrupting on every message received, interrupt when queue goes from empty to not-empty. | R/W |
| INT_NFULL_2_FULL | If not interrupting on every message received, interrupt when queue goes from not full to full. | R/W |

In addition to the PIUMA core architectural modifications to send a multicast packet into the PIUMA network, the switch port request configuration registers can be set to support multicast.

Note that the architecture of the switch collectives may not change to support the multicast, however, the implementation of the multicast can vary from the reductions and barriers in the following ways. The multicast has a forward phase through the network and reductions/barriers have both a forward (up-tree) and reverse (down-tree) phases through the network. The multicast implementation can cause switches to send request packets to each CCE (e.g., the CCE is not conditioned to expect the request before it arrives). In reductions and barriers, these packet types were responses which the CCE was expecting. The connectivity of the switches can allow for a full propagation of the message through the network (e.g., 1-to-many ports), rather than k-ary tree connectivity restriction that the reductions and barriers follow.

Figure 5:
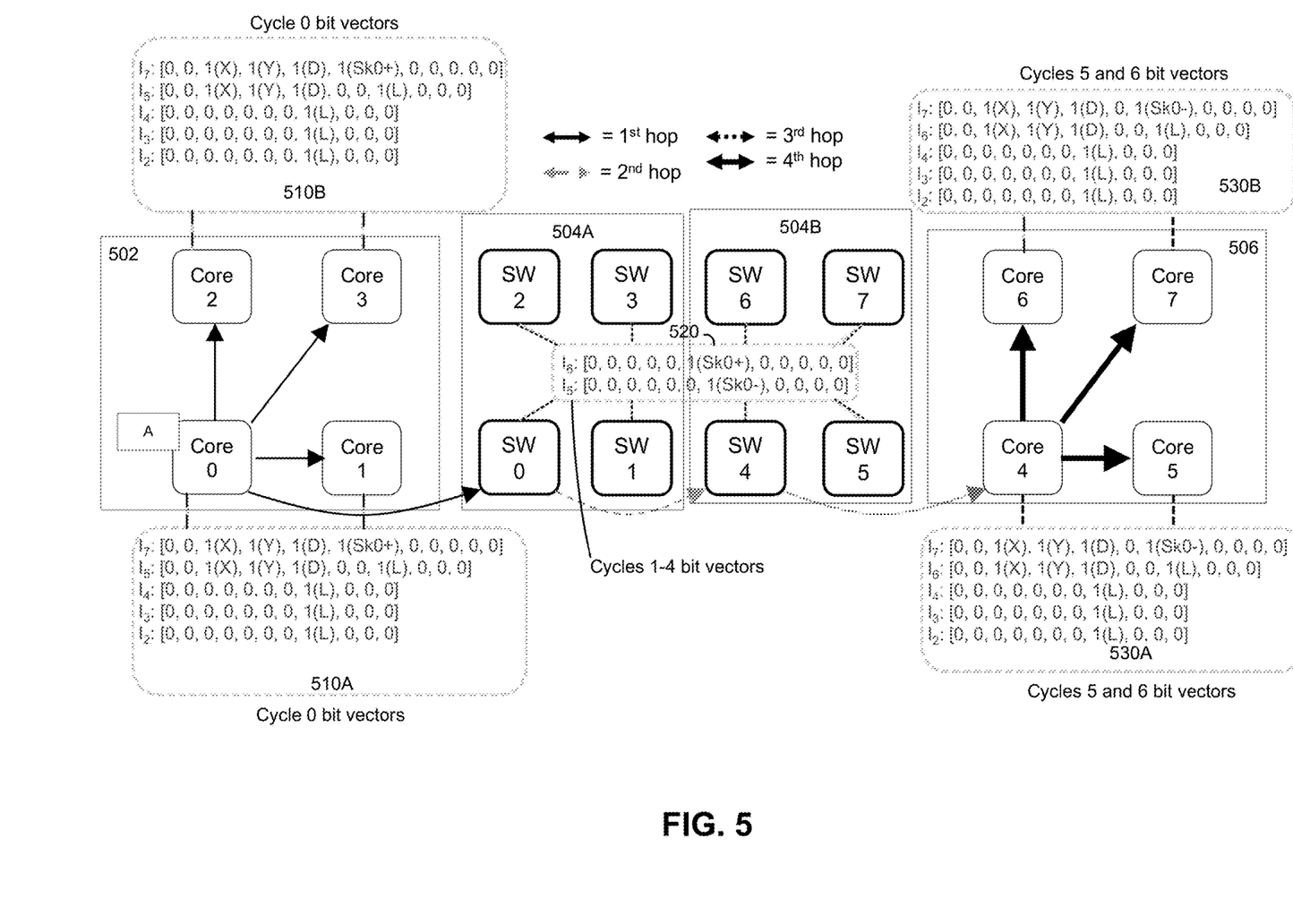
FIG. 5 shows an example of message traversal.

FIG. 5 shows an example of message traversal. In this example, configuration values for a multicast implementation between eight cores in a single PIUMA die are set as shown in FIG. 5. For the purposes of this example, the system on chip (SoC) topology shown in FIG. 1 can be used.

TABLE 3

Switch port numbering used for example in FIG. 5

| PORT | DESCRIPTION | Reference to example of FIG. 5 |
|---|---|---|
| 0 | HSIO port 0 to transmit off die | Not used in example of FIG. 5 |
| 1 | HSIO port 1 to transmit off die | Not used in example of FIG. 5 |
| 2 | Intra-tile X-axis dimension | Notated as X in FIG. 5 |
| 3 | Intra-tile Y-axis dimension | Notated as Y in FIG. 5 |
| 4 | Intra-tile diagonal dimension | Notated as D in FIG. 5 |
| 5 | Inter-tile positive X-axis direction through port 0 | Notated as Sk0+ in FIG. 5 |
| 6 | Inter-tile negative X-axis direction through port 0 | Notated as Sk0− in FIG. 5 |
| 7 | Execution of Mcast.send causes CCE to transmit data (Local port). | Notated as L in FIG. 5 |
| 8 | Inter-tile positive X-axis direction on port 1. | Not used in example of FIG. 5 |
| 9 | Inter-tile negative X-axis direction on port 1. | Not used in example of FIG. 5 |
| 10 | Send/Receive data to/from Switch Collective Engine | Not used in example of FIG. 5 |

Configurations or bit vectors 510A, 510B, 520, 530A, and 530B can be defined using the scheme of Table 3 to indicate direction of data transit from a switch for a 4 tile environment where a direction is either (+) or (−) direction. As shown in FIG. 5, configurations or bitmaps 510A, 510B, 520, 530A, and 530B can be defined as 11 bit vectors corresponding to respective PORT 0 to 10 in Table 3. Configurations $I_0$, $I_1$, $I_6$, $I_8$, $I_9$, and $I_{10}$, are not used in the example of FIG. 5.

Ports of cores 0 and 1 in tile 502 can be configured using configuration 510A whereas ports of cores 2 and 3 in tile 502 can be configured using configuration 510B. Cores 0 to 3 can include switch devices with ports that can be configured using the configurations as to inter-tile or intra-tile direction of data receipt or inter-tile or intra-tile direction of data forwarding. Switches (e.g., SW0 to SW3 in tile 504A and SW4-SW7 in tile 504B) can be configured using configuration 520. Switches SW0 to SW7 can include ports that can be configured using the configurations as to inter-tile or intra-tile direction of data receipt or inter-tile or intra-tile direction of data forwarding. Likewise, cores 4 and 5 in tile 506 can be configured using configuration 530A whereas cores 6 and 7 in tile 506 can be configured using configuration 530B. Cores 4 to 7 can include switch devices with ports that can be configured using the configurations as to inter-tile or intra-tile direction of data receipt or inter-tile or intra-tile direction of data forwarding. A tile can be part of a die or system-on-chip (SoC) in some examples.

Note that in some examples, inter-tile transfer is made in the (+) X or (−) X direction to a core or switch in a same relative position. For example, core 0 could make an inter-tile transfer of data to switch SW0 or switch SW0 can make an inter-tile transfer to core 0. Similarly, core 1 could make an inter-tile transfer of data to switch SW1 or switch SW1 can make an inter-tile transfer to core 1. Core 2 could make an inter-tile transfer of data to switch SW2 or switch SW2 can make an inter-tile transfer to core 2. Core 3 could make an inter-tile transfer of data to switch SW3 or switch SW3 can make an inter-tile transfer to core 3.

For example, switch SW0 could make an inter-tile transfer of data to switch SW4 or switch SW4 can make an inter-tile transfer to switch SW0. Similarly, switch SW1 could make an inter-tile transfer of data to switch SW5 or switch SW5 can make an inter-tile transfer to switch SW1. Switch SW2 could make an inter-tile transfer of data to switch SW6 or switch SW6 can make an inter-tile transfer to switch SW2. Switch SW3 could make an inter-tile transfer of data to switch SW7 or switch SW7 can make an inter-tile transfer to SW3.

For example, switch SW4 could make an inter-tile transfer of data to core 4 or core 4 can make an inter-tile transfer to switch SW4. Similarly, switch SW5 could make an inter-tile transfer of data to core 5 or core 5 can make an inter-tile transfer to switch SW5. Switch SW6 could make an inter-tile transfer of data to core 6 or core 6 can make an inter-tile transfer to switch SW6. Switch SW7 could make an inter-tile transfer of data to core 7 or core 7 can make an inter-tile transfer to switch SW7.

In the example of FIG. 5, use of configurations 510A, 510B, 520, 530A, and 530B cause transfer of data (labeled as "A") originating from a CCE (not shown) in core 0 to cores 1, 2, and 3, to switch SW0, to switch SW4, and to core 4. Note that the reference to data can also refer to a packet or message with a data, header, and meta-data. Based on configuration 510A, core 0's switch (not shown) forwards the data to cores 1-3 in its tile 502 and SW0 in neighboring tile 504A. Based on configuration 520, switch SW0 sends the data to SW4 in neighboring tile 504B and switch SW4 sends the data to core 4 in neighboring tile 506. Within tile 506, based on configuration 530A, core 4's switch sends the data to core 4's local CCE and to other cores (cores 5-7).

Description next turns to a more specific description of an example of use of bit vectors to program operations of cores and switches to transfer data in cycles 0 to 6. Configurations 510A and 510B can be used in cycle 0, configuration 520 can be used in cycles 1-4, and configurations 530A and 530B can be used in cycles 5 and 6. Configuration register values can indicate propagation directions for a message received by a port. In cycle 0, vectors $I_2$, $I_3$, $I_4$, $I_5$, and $I_7$ are used to program operation of cores 0 to 3.

$I_7$ bit vector indicates core 0 is to originate data A from its data pipeline and CCE. $I_7$ bit vector represents an input to port 7. In this example, data A is received into local input port $I_7$ of core 0 (not directional). For data received at $I_7$, configuration register values indicates data propagation as follows:

[0, 0, 1 (X direction to core 1), 1 (Y direction to core 2), 1 (diagonal direction to core 3), 1 (inter-tile to switch 0), 0,0,0,0,0]. Core 2 receives data at its port i3 (y direction port), Core 3 receives data at its port i4 (diagonal port), and Core 1 receives data at its port i2 (x direction port). In this example, ports 0, 1, and 6 are not used by core 0 and consequently, i0, i1, and i6 are all zeros in this example and are not shown in FIG. 5.

$I_2$ bit vector indicates core 1 is to receive data intra-tile in the X direction from core 0. $I_3$ bit vector indicates core 2 is to receive data intra-tile in the Y direction from core 0. $I_4$ bit vector indicates core 3 is to receive data intra-tile in a diagonal direction from core 0. $I_5$ bit vector indicates core 0 is to transmit data or message an inter-tile from tile 502 to neighboring tile 504A, specifically to a corresponding position switch SW0 (bottom left) in the neighboring tile 504A.

Referring to cycles 1 and 2, $I_6$ bit vector indicates data originates (−)X direction from core 0 to switch SW0. $I_5$ bit vector indicates SW0 is to transmit data or message an inter-tile to neighboring tile 504B, specifically to a corresponding position switch SW4 (bottom left) in the neighboring tile 504A.

Referring to cycles 3 and 4, $I_6$ bit vector indicates switch SW4 receives data originating in (−)X direction from SW0. $I_5$ bit vector indicates SW4 is to transmit data or message an inter-tile to neighboring tile 506, specifically to a corresponding position core 4 (bottom left) in the neighboring tile 506.

In cycle 5, $I_6$ bit vector indicates core 4 receives data originating in the (−)X direction from switch SW4. Next, in cycle 6, based on $I_7$ bit vector, core 4 transmits the data to cores 5, 6, and 7 based on respective bit vectors $I_2$, $I_3$, and $I_4$.

In this example, propagation of a message originating from a core to another cores takes no more than four switch hops. Note that these configurations can be reduced to include only a subset of cores on the die or expanded to other die in the system via the HSIO ports connected to switches SW0 to SW7.

Figure 6:
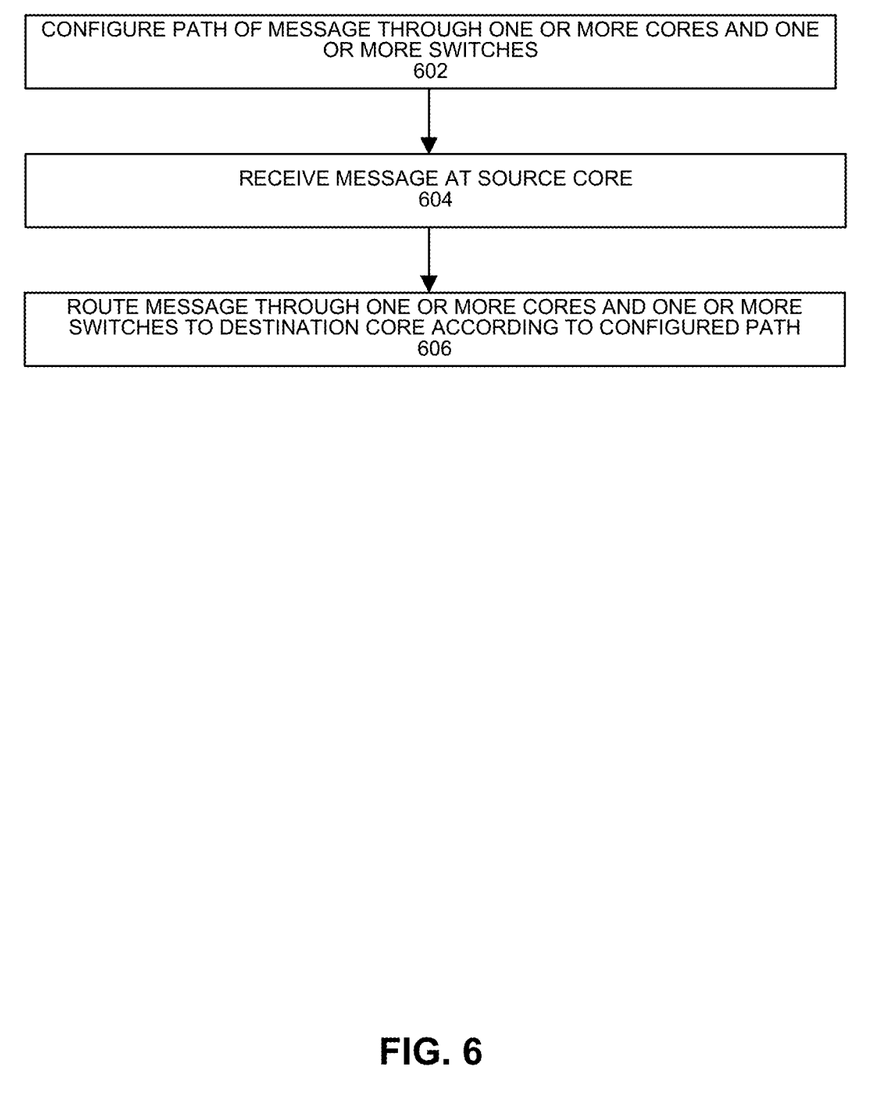
FIG. 6 depicts an example process.

FIG. 6 depicts an example process. At 602, configure cores and switches with path of message from a source core to a destination core. Configuration of ports of a core can be made by a configuration file, register values, or bit vector that can be shared by multiple cores. Configuration of ports of a switch can be made by a configuration file, register values, or bit vector that can be shared by multiple switches. Configuration values can be stored registers accessible to core switches using load and store commands. An mcast tree ID in an mcast.send instruction can identify a configuration for a core or switch to utilize.

At 604, a message can be received at a port of a source core. At 606, based on the configuration, the core can forward the message to another core or switch. Cores and switches can follow the direction of receipt of a received message and direction of transmit of the received message specified by the configuration file, register values, or bit vector. The destination core can receive the message from another core or a switch via a path set by one or more configuration files, register values, or bit vectors. Received data can be accessed through polling, waiting, or interrupts, as described herein.

Figure 7:
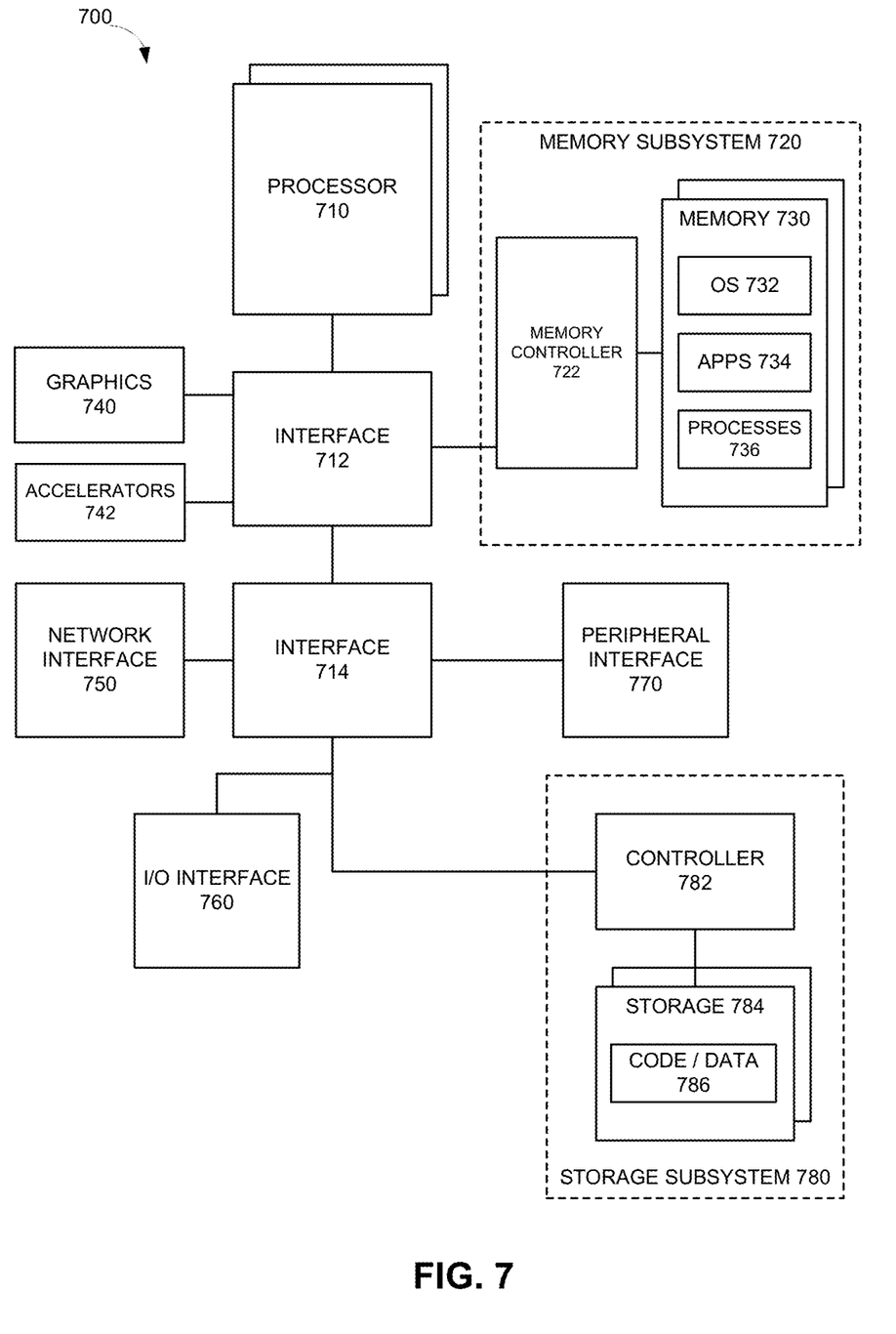
FIG. 7 depicts an example system.

FIG. 7 depicts an example computing system. Components of system 700 (e.g., processor 710, network interface 750, and so forth) to broadcast data or messages through one or more switches, as described herein. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

In some examples, OS 732 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory.

In some examples, interface 712 can include a switching network of multiple switches configured to provide communications using instructions and configuration bit vectors described herein to broadcast or multicast data among devices such as processor 710, memory subsystem 720, graphics 740, accelerators 742, network interface 750, and/or storage subsystem 780.

Some examples of network interface 750 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 700 includes one or more input/output (I/O) interface(s) 760. I/O interface 760 can include one or more interface components through which a user interacts with system 700 (e.g., audio, alphanumeric, tactile/ touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMB A) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (i.e., buses) for coupling appropriate integrated circuits (ICs) and other components mounted to the board.

Various examples can be used in a base station that supports communications using wired or wireless protocols (e.g., 3GPP Long Term Evolution (LTE) (4G) or 3GPP 5G), on-premises data centers, off-premises data centers, edge network elements, edge servers and switches, fog network elements, and/or hybrid data centers (e.g., data center that use virtualization, cloud and software-defined networking to deliver application workloads across physical data centers and distributed multi-cloud environments).

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

In some examples, network interface and other examples described herein can be used in connection with a base station (e.g., 3G, 4G, 5G and so forth), macro base station (e.g., 5G networks), picostation (e.g., an IEEE 802.11 compatible access point), nanostation (e.g., for Point-to-Multi-Point (PtMP) applications).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in examples.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative examples. Furthermore, additional operations may be added or removed depending on the particular applications. Any combination of changes can be used and one of ordinary skill in the art with the benefit of this disclosure would understand the many variations, modifications, and alternative examples thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An example of the devices, systems, and methods may include any one or more, and any combination of, the examples described below.

Example 1 includes one or more examples and includes a computer-readable medium comprising instructions stored thereon, that if executed by at least one processor, cause the at least one processor to: execute one or more message passing instructions that indicate a configuration of a network to send data towards two or more endpoints, wherein the configuration identifies one of multiple paths of data through the network to the two or more endpoints.

Example 2 includes one or more examples, wherein one of the one or more message passing instructions indicate whether a receiver thread is to poll or wait for received data sent at initiation of a message passing instruction of the one or more message passing instructions.

Example 3 includes one or more examples, wherein an endpoint of the two or more endpoints is to manage received data using queues for network configurations and, based on receipt of data at a queue, indicate to a receiver thread one or more received data and associated queue.

Example 4 includes one or more examples, wherein the configuration is to indicate one or more of: a direction of data receipt or a direction to transmit data.

Example 5 includes one or more examples, wherein at least one of the message passing instructions comprises one or more of: a multicast send, multicast poll, or multicast wait.

Example 6 includes one or more examples, wherein the processor comprises a core, accelerator, or graphics processing unit (GPU).

Example 7 includes one or more examples, and includes a method comprising: executing one or more message passing instructions that indicate a configuration of a network to transfer data toward two or more endpoints, wherein the configuration identifies one of multiple paths of data through the network to the two or more endpoints.

Example 8 includes one or more examples, wherein one of the one or more message passing instructions indicate whether a receiver thread is to poll or wait for received data sent at initiation of a message passing instruction of the one or more message passing instructions.

Example 9 includes one or more examples, wherein an endpoint of the two or more endpoints is to manage received data using queues for network configurations and, based on receipt of data at a queue, indicate to a receiver thread one or more received data and associated queue.

Example 10 includes one or more examples, wherein the configuration is to indicate one or more of: a direction of data receipt or a direction to transmit data.

Example 11 includes one or more examples, wherein at least one of the one or more message passing instructions comprises one or more of: a multicast send, multicast poll, or multicast wait.

Example 12 includes one or more examples, wherein the network comprises one or more cores with input and output ports and one or more switches with input and output ports.

Example 13 includes one or more examples, and includes a system comprising: a first group of core nodes to couple with a group of switch nodes and a second group of core nodes to couple with the group of switch nodes, wherein: a core node of the first or second group of core nodes includes circuitry to execute one or more message passing instructions that indicate a configuration of a network to transmit data toward two or more endpoint core nodes and a switch node of the group of switch nodes includes circuitry to execute one or more message passing instructions that indicate the configuration to transmit data toward the two or more endpoint core nodes.

Example 14 includes one or more examples, wherein one of the one or more message passing instructions indicate whether a receiver thread is to poll or wait for received data sent at initiation of a message passing instruction of the one or more message passing instructions.

Example 15 includes one or more examples, wherein an endpoint of the two or more endpoints is to manage received data using queues for network configurations and, based on receipt of data at a queue, indicate to a receiver thread one or more received data and associated queue.

Example 16 includes one or more examples, wherein the configuration is to indicate one or more of: a direction of data receipt or a direction to transmit data.

Example 17 includes one or more examples, wherein at least one of the one or more message passing instructions comprises one or more of: a multicast send, multicast poll, or multicast wait.

Example 18 includes one or more examples, wherein the core node includes a switch circuitry to transmit the data to another node or receive data from another node.

Example 19 includes one or more examples, comprising a data center, wherein the data center comprises the first group of core nodes, the second group of core nodes, and the group of switch nodes and wherein the data center comprises at least one memory device to receive and store the data.

Example 20 includes one or more examples, wherein the first group of core nodes, the second group of core nodes, and the group of switch nodes are based, at least, in part on: Intel® Programmable and Integrated Unified Memory Architecture (PIUMA), NVIDIA Graphcore, or Cray Graph Engine.

Example 21 includes one or more examples, and includes a system comprising: a switch device comprising multiple ports, wherein a bit vector in a configuration register is to indicate a receive or transmit direction for the multiple ports.

Example 22 includes one or more examples, wherein the receive or transmit direction for the multiple ports comprises one or more of: diagonal, X direction, Y direction, inter-tile, or intra-tile.

What is claimed is:

1. At least one non-transitory computer-readable medium comprising instructions stored thereon, that if executed by at least one processor, cause the at least one processor to:

execute a single instruction of an instruction set architecture (ISA) that defines a configuration for a multicast operation, wherein:
the configuration is accessed from a register,
the configuration indicates output ports for data multicast through nodes in a network,
the configuration identifies one of multiple paths of the data through the network to two or more endpoints, and
the network comprises a system on chip (SoC) comprising switch circuitry to communicatively couple multiple processor cores.

2. The computer-readable medium of claim 1, wherein the single instruction indicates whether a receiver thread is to poll or wait for received data.

3. The computer-readable medium of claim 1, wherein an endpoint of the two or more endpoints is to manage received data using queues for network configurations and, based on receipt of data at a queue, indicate to a receiver thread one or more received data and associated queue.

4. The computer-readable medium of claim 1, wherein the configuration is to indicate one or more of: a direction of data receipt or a direction to transmit data.

5. The computer-readable medium of claim 1, wherein single instruction comprises one or more of: a multicast send, multicast poll, or multicast wait.

6. The computer-readable medium of claim 1, wherein at least one of the multiple processor cores comprises a core, accelerator, or graphics processing unit (GPU).

7. A method comprising:
executing a single instruction of an instruction set architecture (ISA) that defines a configuration for a multicast operation, wherein:
the configuration is stored in a register,
the configuration identifies one of multiple paths of data through a network to two or more endpoints,
the configuration indicates output ports for the data multicast through nodes in the network,
the configuration identifies one of multiple at least one path of the data through the network to the two or more endpoints, and
the network comprises a system on chip (SoC) comprising switch circuitry to communicatively couple multiple processor cores.

8. The method of claim 7, wherein one of the single instruction indicates whether a receiver thread is to poll or wait for received data.

9. The method of claim 7, wherein an endpoint of the two or more endpoints is to manage received data using queues for network configurations and, based on receipt of data at a queue, indicate to a receiver thread one or more received data and associated queue.

10. The method of claim 7, wherein the configuration is to indicate one or more of: a direction of data receipt or a direction to transmit data.

11. The method of claim 7, wherein the single instruction comprises one or more of: a multicast send, multicast poll, or multicast wait.

12. The method of claim 7, wherein one or more cores of the multiple processor cores are coupled to input and output ports and the switch circuitry comprises input and output ports.

13. A system comprising:
a system on chip (SoC) comprising:
a group of switch nodes;
a register;
a first group of core nodes to couple with the group of switch nodes; and
a second group of core nodes to couple with the group of switch nodes, wherein:
a core node of the first group of core nodes includes circuitry to execute a single instruction of an instruction set architecture (ISA) that indicates a configuration for a multicast operation,
a switch node of the group of switch nodes includes circuitry to execute one or more message passing instructions based on the configuration,
the configuration is accessed from the register,
the configuration indicates output ports for data multicast through nodes in the group of switch nodes, and
the configuration identifies one of multiple at least one path of the data through the group of switch nodes to two or more endpoint core nodes.

14. The system of claim 13, wherein the single instruction indicates whether a receiver thread is to poll or wait for received data.

15. The system of claim 13, wherein an endpoint of the two or more endpoints is to manage received data using queues for network configurations and, based on receipt of data at a queue, indicate to a receiver thread one or more received data and associated queue.

16. The system of claim 13, wherein the configuration is to indicate one or more of: a direction of data receipt or a direction to transmit data.

17. The system of claim 13, wherein the single instruction comprises one or more of: a multicast send, multicast poll, or multicast wait.

18. The system of claim 13, wherein a core node of the first group of core nodes includes a switch circuitry to transmit the data to another node or receive data from another node.

19. The system of claim 13, comprising a data center, wherein the data center comprises the first group of core nodes, the second group of core nodes, and the group of switch nodes and wherein the data center comprises at least one memory device to receive and store the data.

20. The system of claim 13, wherein the first group of core nodes, the second group of core nodes, and the group of switch nodes are based, at least, in part on: Programmable and Integrated Unified Memory Architecture (PIUMA).

21. A system comprising:
a switch device comprising a system on chip (SoC) comprising multiple processor cores, switch circuitry to communicatively couple the multiple processor cores, and multiple ports, wherein:
the switch device is to multicast data based on execution of a single instruction of an instruction set architecture (ISA) that defines a bit vector in a configuration register that is to indicate a receive or transmit direction of the data through the multiple ports.

22. The system of claim 21, wherein the receive or transmit direction for the multiple ports comprises one or more of: diagonal, X direction, Y direction, inter-tile, or intra-tile.

23. The computer-readable medium of claim 1, wherein the configuration identifies an input direction for the data multicast through nodes in the network.

24. The computer-readable medium of claim 1, wherein the single instruction comprises a multicast send instruction that is to specify a multicast tree, size of data to be sent, and sending thread.

25. The computer-readable medium of claim 1, wherein the ISA further comprises a multicast poll instruction.

26. The computer-readable medium of claim 1, wherein the ISA further comprises a multicast wait instruction.

\* \* \* \* \*

UNITED STATES PATENT AND TRADEMARK OFFICE
CERTIFICATE OF CORRECTION

PATENT NO. : 12,388,712 B2
APPLICATION NO. : 17/473540
DATED : August 12, 2025
INVENTOR(S) : Pawlowski et al.

Page 1 of 1

It is certified that error appears in the above-identified patent and that said Letters Patent is hereby corrected as shown below:

In the Claims

Column 17, Line 25, Claim 5 should read as follows:
The computer-readable medium of claim 1, wherein the single instruction comprises one or more of: a multicast send, multicast poll, or multicast wait.

Signed and Sealed this
Ninth Day of September, 2025

Coke Morgan Stewart
*Acting Director of the United States Patent and Trademark Office*